(12) United States Patent
MacCormick et al.

(10) Patent No.: US 7,027,951 B1
(45) Date of Patent: Apr. 11, 2006

(54) METHOD AND APPARATUS FOR ESTIMATING TIME DELAYS IN SYSTEMS OF COMMUNICATING NODES

(75) Inventors: John Philip MacCormick, Mountain View, CA (US); Marcos Kawazoe Aguilera, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/965,915

(22) Filed: Oct. 18, 2004

(51) Int. Cl.
*G06F 15/00* (2006.01)
*G06F 17/18* (2006.01)

(52) U.S. Cl. ............ 702/181; 702/179; 702/187; 709/201

(58) Field of Classification Search ........... 702/179, 702/181, 182, 186, 187, 188; 709/201, 202, 709/203, 210; 707/1, 10; 713/170, 178
See application file for complete search history.

(56) References Cited

U.S. PATENT DOCUMENTS

| | | | |
|---|---|---|---|
| 6,223,286 B1 * | 4/2001 | Hashimoto | ........... 713/178 |
| 2003/0152110 A1 * | 8/2003 | Rune | ........... 370/509 |
| 2004/0111706 A1 | 6/2004 | Mogul | |

OTHER PUBLICATIONS

Marcos K. Aguilera et al, Performance Debugging For Distributed Systems Of Black Boxes, Proceedings of 19th ACMSymposium on Operating Systems Principles, Bolton Landing, NY, Oct. 2003, 16 pages, Association For Computing Machinery (ACM).

Todd K. Moon, The Expectation—Maximization Algorithm, IEEE Signal Processing Magazine, Nov. 1996, pp. 47-60.

U.S. Appl. No. 10/601,371, filed Jun. 23, 2003, inventors: Marcos K. Aguilera and Jeffrey C. Mogul, entitled "Analysis Of Causal Relations Between Intercommunicating Nodes", unpublished.

* cited by examiner

*Primary Examiner*—Bryan Bui
(74) *Attorney, Agent, or Firm*—Richard P. Lange (57) ABSTRACT

A method for calculating a probability distribution that represents probabilities of occurrence of time differences between causally related incoming messages and outgoing messages of a node in a system of communicating nodes is described. The method comprises obtaining a set of time differences between times at which incoming messages arrive at a node and times at which outgoing messages leave the node, the set of time differences including time differences between causally related incoming messages and outgoing messages and time differences between incoming messages and outgoing messages that are not causally related. The method also comprises processing the set of time differences using a statistical estimation algorithm to calculate the probability distribution that represents probabilities of occurrence of time differences between causally related incoming messages and outgoing messages. An apparatus configured to execute the methods is also described.

55 Claims, 5 Drawing Sheets

Start

↓

202 — Obtain pair-wise time differences $w_k$ between times $u_i$ at which incoming messages enter a node and times $v_j$ at which outgoing messages leave the node

↓

204 — Calculate $n_l$ for $l=1, 2, ... K$, where $n_l$ is the number of the $w_k$ within the range of the l-th bin

↓

206 — Initialize probability distribution $W(h_l)$, where $h_l$ is a probability density of a causal time difference being within the range of in an l-th bin, and initialize $\alpha$, where $\alpha$ is a fraction of the $w_k$ that are causal, $h_l$ and $\alpha$ being variables

↓

208 — Calculate an expected number of causal time differences $C_l$ within the range of the l-th bin based upon $\alpha$, $h_l$ and $n_l$

↓

210 — Calculate an updated probability distribution $W(h_l)$ based upon the $C_l$

↓

212 — Calculate an updated fraction $\alpha$ based upon the $C_l$

↓

214 — Convergence? — No (loop back to 208)

↓ Yes

End

METHOD AND APPARATUS FOR
ESTIMATING TIME DELAYS IN SYSTEMS
OF COMMUNICATING NODES

BACKGROUND

The present disclosure relates to analyzing time differences between incoming messages and outgoing messages at nodes of a system of communicating nodes. More particularly, the present disclosure relates to determining probability distributions representative of time differences between causally related incoming and outgoing messages for nodes of a system of communicating nodes.

Information systems, such as Internet-based systems, are often composed of multiple communicating components and are often structured as distributed systems, wherein different components may run on different computers, on different processors or in different processes. Such systems may exhibit slow performance in the sense that components of the system may have large time delays (also referred to as latencies) between causally related incoming and outgoing messages, and it can be difficult to identify the source(s) of such slow performance. For example, software may come from different vendors, and source code for the software may not be available. In addition, different vendors may provide support for their own components, but not for problems associated with communication between components of multiple vendors. Identifying problematic components to diagnose and debug such systems can be challenging and time consuming, especially for complex systems.

SUMMARY

A method for calculating a probability distribution that represents time differences between causally related incoming messages and outgoing messages of a node in a system of communicating nodes is described. The method comprises obtaining (e.g., calculating or receiving) a set of time differences between times at which incoming messages arrive at a node and times at which outgoing messages leave the node, the set of time differences including time differences between causally related incoming messages and outgoing messages and time differences between incoming messages and outgoing messages that are not causally related. The method also comprises processing the set of time differences using a statistical estimation algorithm to calculate the probability distribution that represents time differences between causally related incoming messages and outgoing messages of the node.

An apparatus comprising a memory and means (such as a processing unit) for executing the method is also described. A computer readable carrier containing processing instructions adapted to cause a processing unit to execute the method is also described.

BRIEF DESCRIPTION OF THE DRAWINGS

Various features and advantages of the exemplary embodiments will become apparent from the following description with reference to the attached figures. It is noted that not all possible embodiments necessarily exhibit each and every, or any, of the advantages identified herein.

DETAILED DESCRIPTION OF EXEMPLARY EMBODIMENTS

Figure 1A:
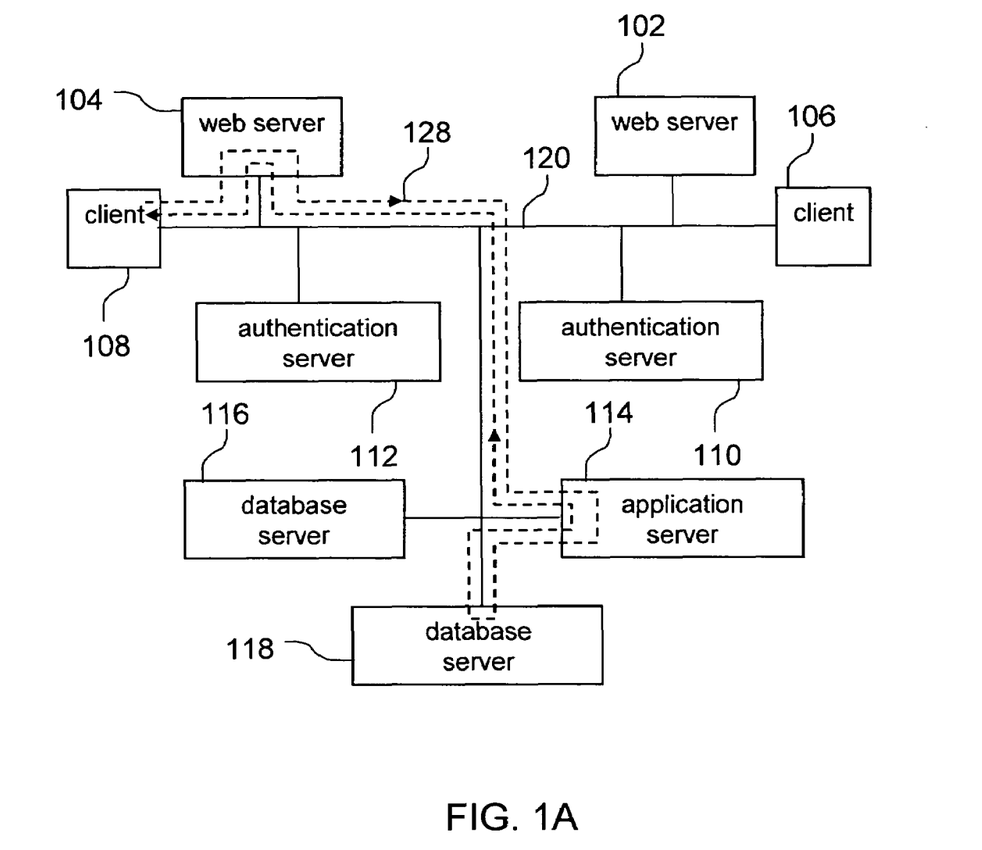
FIG. 1A is a block diagram of an exemplary system of communicating nodes.

FIG. 1A illustrates in block form an exemplary system of communicating nodes. The exemplary system comprises a plurality of communicating nodes 102–118 that can communicate via communication links 120. For example, such nodes can communicate with one another via the Internet, wherein the communication links 120 can include, for example, wired, wireless and/or optical links. The nodes 102–118 can represent various types of components including, but not limited to, host computer systems in a distributed data processing system, computer processes, threads, active objects, disk drives, switches and routers or various combinations thereof, e.g., web clients, web servers, application servers, database servers and authentication servers. As an example, a multi-tiered system might exhibit requests from web clients that flow through a web-server front-end and then to a web application server, which in turns makes calls to a database server and perhaps to additional services, such as name service and credit-card authorization.

Nodes can communicate via communication links between the nodes. For example, nodes that are computers can communicate via network links between the computers. Also, for example, nodes that are processes can communicate via interprocess communication channels. Also, for example, nodes that are threads can communicate via thread-to-thread messages or events. Also, for example, nodes that are objects can communicate via object invocations and responses. Messages, as referred to herein, can include any type of communication event between nodes. Both the nodes and the communication links can have characteristic time differences between causally related incoming messages and outgoing messages. Time differences between causally related messages can include, for example, communications delays along the communication links, and compute-time delays or input/output delays or latencies at the nodes.

The present disclosure describes, among other things, identifying sources of performance problems in complex systems of communicating components without analyzing the inner functions of the components (i.e., by treating the components as "black box" components) and without parsing messages (e.g., without attempting gain an understanding of the message content). In particular, the present disclosure describes determining probability distributions that represent probabilities of occurrence of time differences between causally related incoming messages and outgoing messages for nodes of a system using statistical estimation, thereby allowing identification of long-latency nodes and long-latency paths in the system without the need for a detailed understanding of either the system, its components, or the messages. Of course, parsing the messages can be done, if desired, to obtain additional information, such as message content, which may be useful. Probability distributions that represent probabilities of occurrence of time differences between causally related incoming messages and outgoing messages can be calculated for communication links using the methods described herein by viewing the communication links as virtual nodes and by applying the methods described herein for nodes.

Figure 1B:
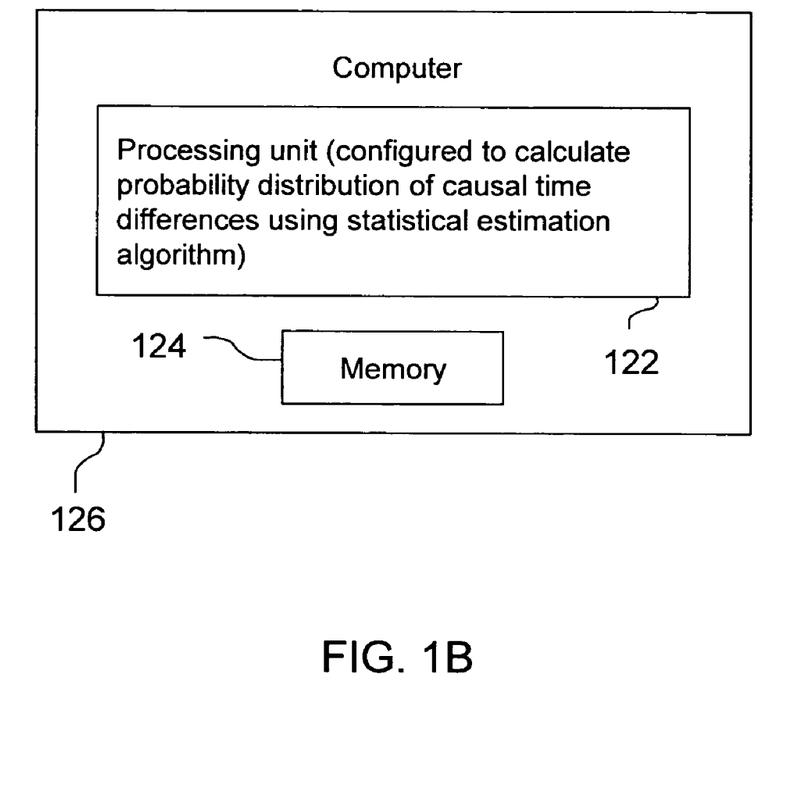
FIG. 1B is a block diagram illustrating an exemplary apparatus for calculating a probability distribution that represents probabilities of occurrence of time differences between causally related incoming messages and outgoing messages of a node.

According to an exemplary embodiment, there is provided an apparatus for calculating a probability distribution that represents probabilities of occurrence of time differences between causally related incoming messages and outgoing messages of a node in a system of communicating nodes. As shown in FIG. 1B, for example, the apparatus comprises a memory 124 and means, such as processing unit 122, for example, for obtaining a set of time differences between times at which incoming messages arrive at a node and times at which outgoing messages leave the node, the set of time differences including time differences between causally related incoming messages and outgoing messages and time differences between incoming messages and outgoing messages that are not causally related, and for processing the set of time differences using a statistical estimation algorithm to calculate the probability distribution that represents probabilities of occurrence of time differences between causally related incoming messages and outgoing messages of the node. For example, the set of time differences can be determined without attempting to identify causal relationships between particular incoming messages and particular outgoing messages. Also, for example, processing the set of time differences with the statistical estimation algorithm can be carried out without attempting to identify causal relationships between particular incoming messages and particular outgoing messages.

The processing unit 122 shown in FIG. 1B is arranged to communicate with the memory 124 and can be any suitable processing unit, such as one or more computer processors, one or more field programmable gate array (FPGA) devices, or one or more specialized circuits (e.g., discrete logic gates interconnected to perform a specialized function), or any suitable combination thereof. As shown in the example of FIG. 1B, the processing unit 122 and the memory 124 can be configured as part of a computer 126 (e.g., a personal computer). The computer could optionally be connected, if desired, to the nodes 102–118 shown in FIG. 1A via a communication link 120. However, it is not necessary for the computer 126 to be connected to with the nodes 102–118, and the computer 126 can, for example, process locally stored data relating to the set of time differences obtained during an earlier state of interconnection or obtained from another source. The processor 122 can obtain the set of time differences by calculating the set of time differences itself from a collection of incoming messages and outgoing messages, or by receiving the set of time differences from one or more other sources that have calculated the set of time differences. The memory 124 can be arranged, for example, outside the processing unit 122, inside the processing unit 122, or as a unit along with the processing unit 122.

The processing unit 122 is configured to execute a method for calculating a probability distribution that represents probabilities of occurrence of time differences between causally related incoming messages and outgoing messages of a node in a system of communicating nodes. The method comprises obtaining a set of time differences between times at which incoming messages arrive at a node and times at which outgoing messages leave the node, the set of time differences including time differences between causally related incoming messages and outgoing messages and time differences between incoming messages and outgoing messages that are not causally related, such as represented at step 202 of the exemplary method 200 illustrated in the flow diagram of FIG. 2. The times when the input messages occurred can be referred to as $u_1, u_2, \ldots, u_m$, and the times when the output messages occurred can be referred to as $v_1, v_2, \ldots, v_n$. The set of all possible time differences between the incoming messages and the outgoing messages is given by the various values of $w_k = v_j - u_i$ for all pair-wise combinations of $v_j$ and $u_i$ where $i=1, 2, \ldots, m$, and where $j=1, 2, \ldots, n$. There are n·m such time differences in a time difference range [0, T] where T represents a specified maximum time difference, such as the maximum possible time difference for the set of time differences or a maximum time difference of interest. The parameter T can be chosen, for example, to encompass all time differences of the set of time differences or to encompass a portion of the set of time differences (e.g., 30%, 40%, 50%, 60%, 70%, 80% or 90%). Those time differences that are negative can be ignored. Thus, the non-negative time differences less than T can be referred to as $w_1, w_2, \ldots, w_N$, where $w_k = v_j - u_i$, and there are N such $w_k$.

Figure 2:
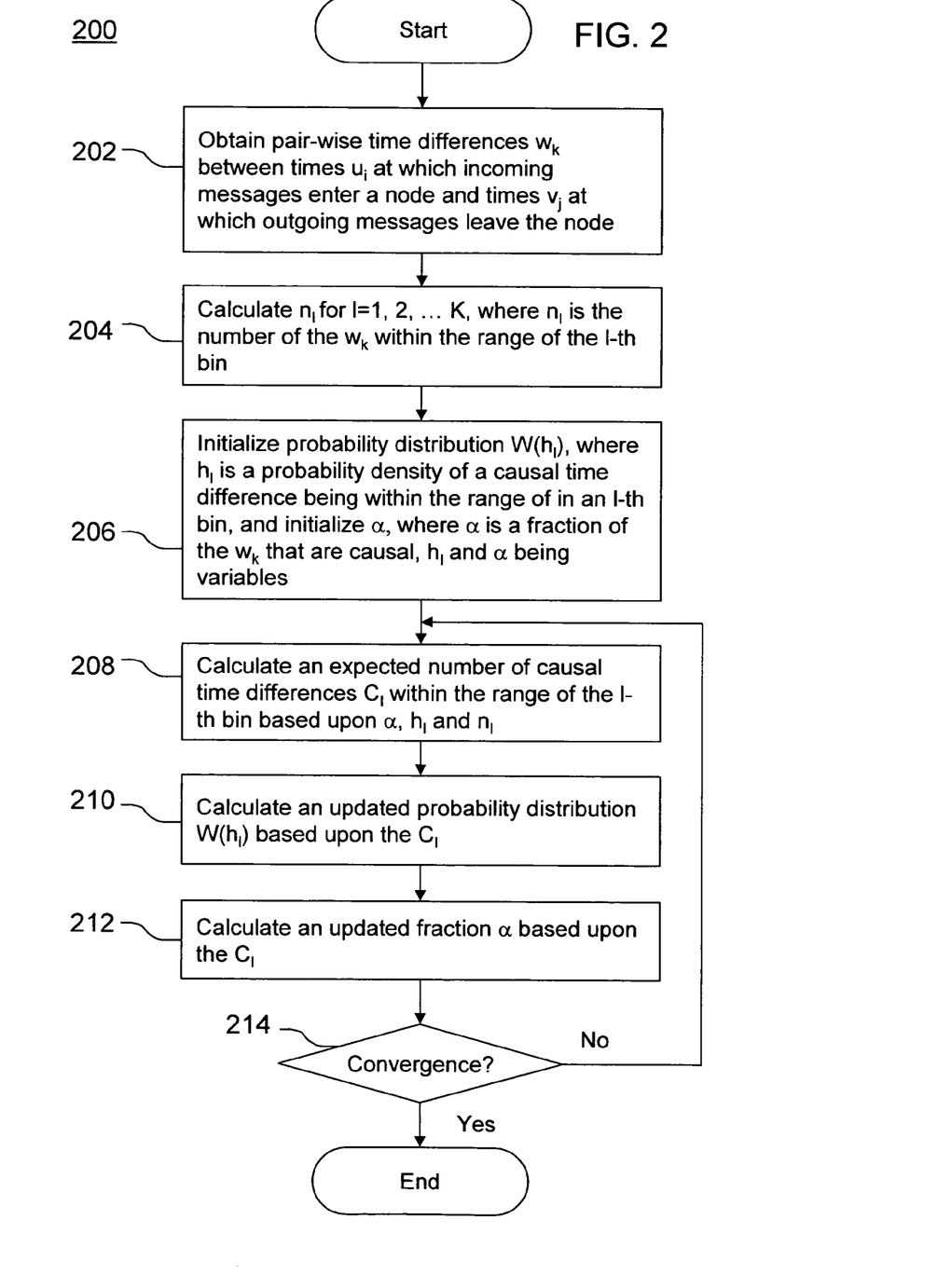
FIG. 2 is a flow diagram of an exemplary method of calculating a probability distribution that represents probabilities of occurrence of time differences between causally related incoming messages and outgoing messages of a node.

The processing unit 102 can itself calculate the set of time differences $w_k$. Alternatively, the processing unit 122 can receive the set of time differences $w_k$ already calculated from another source.

Figure 3:
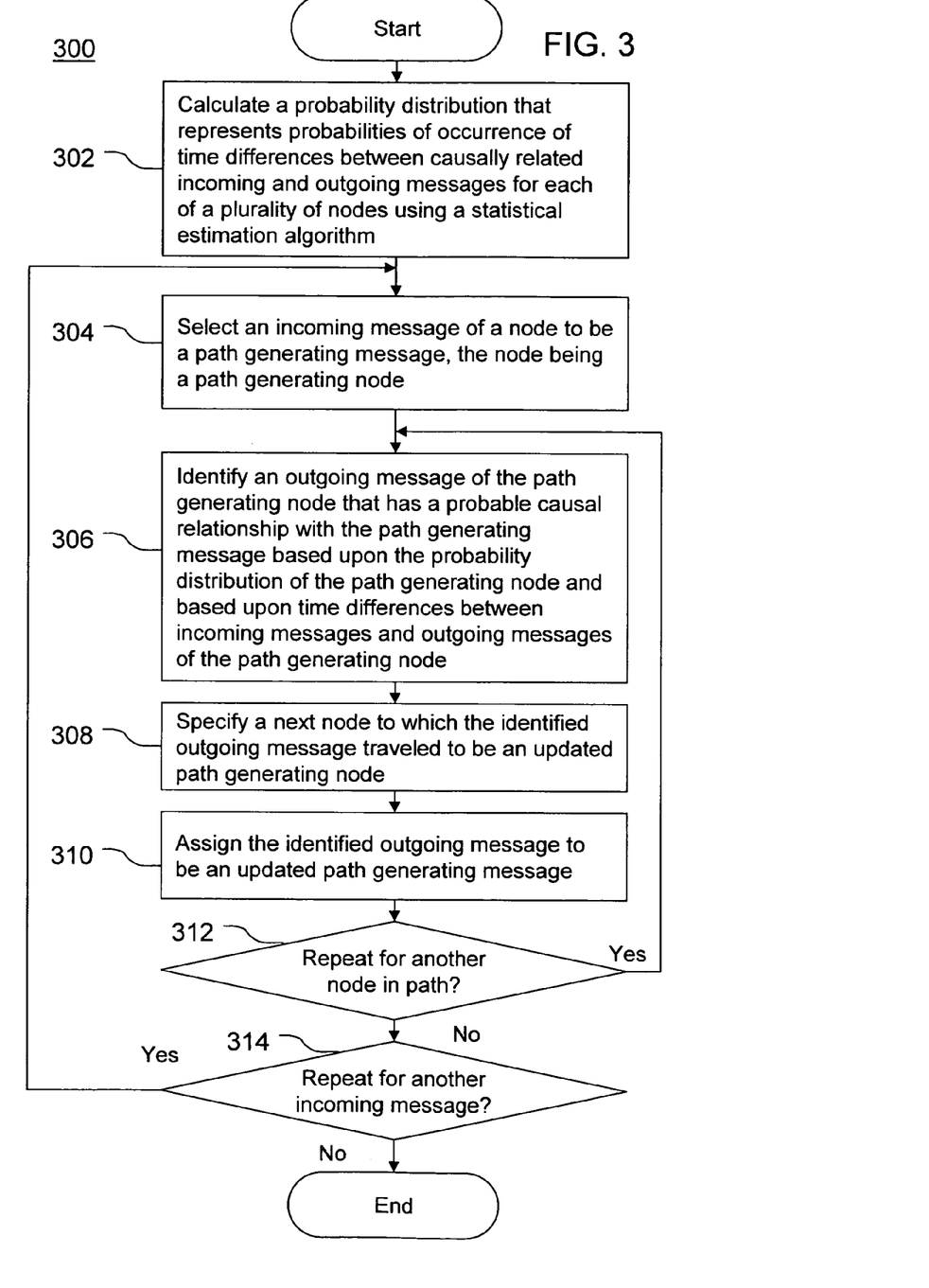
FIG. 3 is a flow diagram of an exemplary method for determining a causal path in a system of communicating nodes.

The method executed by the processing unit 122 also comprises processing the set of time differences using a statistical estimation algorithm to calculate the probability distribution that represents probabilities of occurrence of time differences between causally related incoming messages and outgoing messages of the node under consideration. The processing can be carried out, for example, without attempting to identify causal relationships between particular incoming messages and particular outgoing messages. Exemplary method steps for processing the set of time differences using a statistical estimation algorithm in this regard are illustrated at steps 204–214 of FIG. 2, which will be described in further detail below. It will be understood that the methods described herein, such as illustrated in the examples of FIGS. 2 and 3, can be implemented in any suitable fashion and are not limited to implementation with the processing unit 122 illustrated in FIG. 1B.

Some incoming messages of a given node are expected to causally generate one or more outgoing messages of the node. However, some outgoing messages are not expected to be caused by any incoming messages. In other words, a causal relationship does not necessarily exist for all incoming and outgoing messages of a given node. Thus, some of the time differences calculated at step 202 are expected to be time differences between causally related incoming and outgoing messages (which may referred to as causal time differences, for brevity) and others are expected to be time differences between incoming messages and outgoing messages that are not causally related (which may referred to as non-causal time differences, for brevity). The statistical estimation algorithm models both causal time differences and non-causal time differences so that their respective contributions can be separated, thereby allowing determination of the probability distributions that represent the probabilities of causal time differences.

In addition, it is possible for an outgoing message of a node to be the same, in terms of content, as the incoming message, but delayed in time by the node (e.g., an e-mail message that is routed through a router, but delayed by the router). Such an outgoing message is causally related to the incoming message. It is also possible for an outgoing message to be different, in terms of content, compared to the incoming message (e.g., a message from a database in response to a message with a query to the database). Such an outgoing message is also causally related to the incoming message.

Also, as will be discussed further below by way of an example, the statistical estimation algorithm can treat a fraction of the time differences as being between messages that are causally related, wherein the fraction is a variable to be determined by the statistical estimation algorithm, and the non-causal time differences can be modeled with a uniform probability distribution.

To calculate probability distributions that represent probabilities of occurrence of time differences between causally related incoming messages and outgoing messages for nodes of a system, the set of time differences are obtained, and the set of time differences can be derived from information about the incoming messages and outgoing messages. A set of incoming and outgoing messages may be referred to as a message trace. The information of interest includes a timestamp, a source identifier and a destination identifier. The source and destination identifiers allow identifying which messages are incoming messages of a given node and which messages are outgoing messages of that node. The timestamps provide the times at which incoming messages arrive and the times at which outgoing messages leave. It is not necessary for the local clocks of different nodes to be synchronized with one another. It is advantageous if the local clocks of different nodes accurately measure intervals of real time. Other information about messages, such as message content, for example, can also be gathered if desired, but this is not necessary. A number of techniques can be used to obtain the information of interest about the messages including passive network monitoring (e.g., for communication that flows between computers, on unencrypted paths), kernel instrumentation, middleware instrumentation, and application instrumentation, which are well known to those of ordinary skill in the art.

Figure 4:
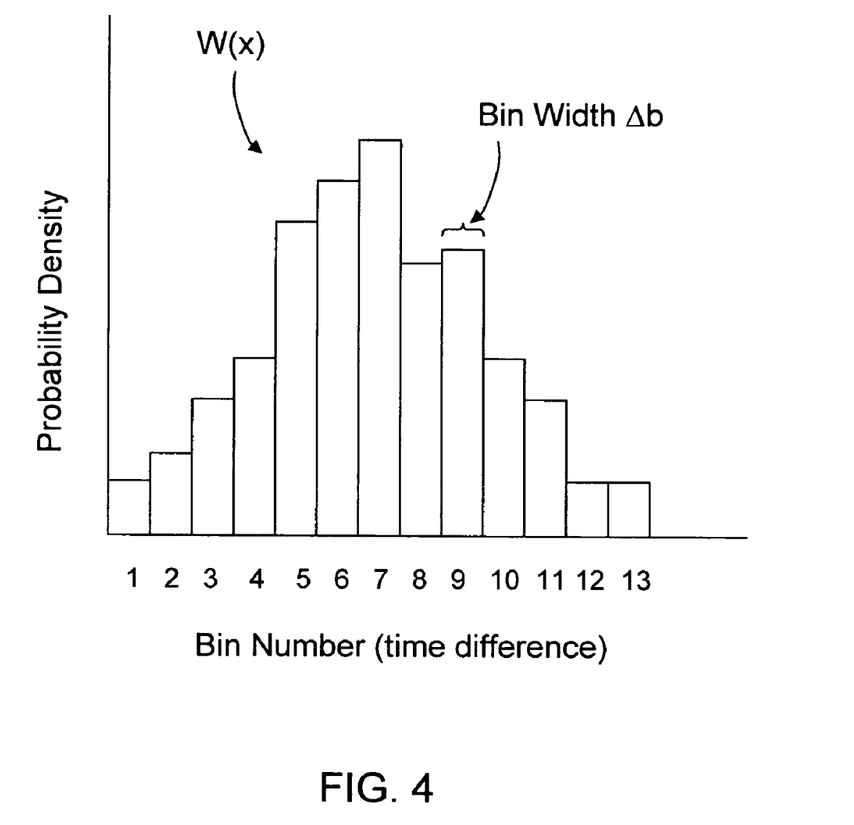
FIG. 4 illustrates an exemplary hypothetical probability distribution that represents probabilities of occurrence of time differences between causally related incoming messages and outgoing messages of a node, which may be referred to as W(x).

The probability distribution that represents probabilities of occurrence of time differences between causally related incoming messages and outgoing messages can be treated as a discrete distribution comprising a plurality of bins wherein a width of each bin is defined by an upper time difference and a lower time difference, wherein each bin has an associated probability density corresponding to a probability of a causal time difference occurring within a given bin, and wherein each probability density is a variable to be determined by the statistical estimation algorithm. An example of a hypothetical probability distribution that represents probabilities of causal time differences is W(x) illustrated in FIG. 4 that has a value $h_l$ for an l-th bin, wherein $h_l$ represents a probability density corresponding to a probability of a causal time difference occurring in the l-th bin. The integrated area of the probability distribution W(x) is normalized to 1 (one). In this regard, the probability distribution W(x) of a node may be considered to be a histogram-type function. This does not mean, however, that the probability distribution W(x) needs to be graphically presented in histogram form. A histogram as referred to herein includes a mathematical construct in which information is aggregated into a plurality of discrete mathematical bins and does not necessarily mean that the information is displayed in graphical form.

The widths of the bins of the probability distribution can be chosen in any suitable manner. For example, the widths of the bins can be chosen to be equal, or the widths can be chosen to increase exponentially with time difference, or to increase linearly with time difference, or to increase according to some other function of the time difference. Using exponentially increasing bin widths allows covering a large range of time differences with relatively few bins. In addition, it is advantageous to choose the bin widths so that at least some time differences of the set of time differences fall within the range of each bin.

According to one aspect, the statistical estimation algorithm can be an iterative algorithm wherein iterations are carried out until a convergence criterion is satisfied, such as, for example, a maximum likelihood estimate (MLE) algorithm. More particularly, for example, the statistical estimation algorithm can be an expectation-maximization (EM) algorithm. Exemplary process steps for processing the set of time differences using a statistical estimation algorithm that is an EM algorithm are shown in FIG. 2 with reference to the exemplary method 200.

The exemplary statistical estimation algorithm begins at step 204, using as input the set of time differences $w_k$ obtained at step 202. As shown at step 204, the method comprises calculating the number $n_l$ of time differences (which include both causal and non-causal time differences) within a range corresponding to the range of each bin of the probability distribution (i.e., $n_l$ is calculated for l=1, 2, . . . , K, where l refers to a given bin, and there are K bins). The collection of $n_l$ may be referred to as time-difference histogram data. For brevity, reference may be made herein to the "l-th bin" without specifying whether that bin corresponds to the l-th bin of the probability distribution W(x), or the l-th bin of the time-difference histogram data, since the usage will be readily apparent from the context. Calculating the time-difference histogram data can be done with any suitable algorithm, including simply using a brute force approach for counting the number of time differences $n_l$ that fall within the boundaries of each bin. A more efficient algorithm for calculating the number of time differences within each bin is described elsewhere herein.

As shown at step 206, the method 200 further comprises initializing the probability distribution W(x) (i.e., initializing the $h_l$) for l=1, 2, . . . , K, wherein each $h_l$ represents a probability density of a causal time difference being within a range of an l-th bin and wherein each $h_l$ is a variable whose ultimate value will be determined by the statistical estimation algorithm. A variable $\alpha$ is also initialized, wherein $\alpha$ represents an estimated fraction of the time differences that are for causally related incoming messages and outgoing messages. The $h_l$ and $\alpha$ can be initialized with good guesses determined in any suitable manner. For example, if it is known from historical information, e.g., prior analyses, that causal time differences for a system of nodes tend to follow a curve of a particular shape (e.g., a bell-shaped curve), then the $h_l$ can be chosen and normalized to approximately follow a curve of that shape (e.g., a normalized bell-shaped curve, such as a Gaussian function). Further, a typical value of the fraction of messages that are causally related may be known from prior analyses, and that information can be used to select an initial value for $\alpha$. For practical systems, initial values of $\alpha$ of 0.1, 0.2, 0.3 and 0.4 can be suitable.

Alternatively, a cursory review of time-difference histogram data (e.g., some or all of such data) determined at step 204 can be used to select initialization values for W(x) and $\alpha$. For example, the time-difference histogram data may approximately follow a curve of a given shape superimposed on an apparent uniform offset. The initial value of $\alpha$ can be chosen to approximately reflect the ratio of the area of the uniform offset portion of the time-difference histogram data to the area of the curve-shaped portion of the histogram data. This can be a suitable approach because, as noted elsewhere herein, it is expected that non-causal time differences can be well approximated by a uniform probability distribution function. That is, time differences that are calculated between messages that have no causal relation may be expected to be uniformly distributed as a function of time difference. The initialization values for W(x) can be chosen to approximately follow a normalized version of the curve representative of the time-difference histogram data minus the offset portion.

Alternatively, even in the absence of prior information on which to base an initialization, various initialization values can simply be chosen for separate test runs of the statistical estimation algorithm applied to a test node to assess which ranges of initialization values lead to stable final results, and this can be a basis for selecting initialization values for other nodes in the system.

Other approaches for initializing W(x) and $\alpha$ with good initial guesses can be used as will be apparent to one of ordinary skill in the art, and choosing a suitable approach, whether those described above or other, is within the purview of one of ordinary skill in the art. It is advantageous to choose non-zero values for the initialization values.

As shown at step 208, the method 200 also comprises calculating an expected number of causal time differences $C_l$ within the range of the l-th bin based upon $\alpha$, $h_l$ and $n_l$, for l=1, 2, . . . , K. For example, the expected number of causal time differences, $C_l$, can be given by the equation:

$$C_l = \frac{n_l \cdot \alpha \cdot h_l}{\alpha \cdot h_l + (1-\alpha)/T} \quad (1)$$

wherein the parameters $n_l$, $\alpha$, $h_l$ and T are as previously described.

For reasons described elsewhere herein, it is advantageous to impose upon W(x) a maximum time difference M between causally related incoming messages and outgoing messages, where M<T. For example, M can be selected such that some predetermined non-negligible percentage (e.g., 1%, 2%, 3%, 5%, 7%, 10%) of time differences fall within the range [M, T]. Time differences greater than M are not considered for purposes of calculating values of $C_l$ or $n_l$ in connection with W(x).

Equation (1) follows directly from considering that a non-causal probability distribution for non-causal time differences is likely to be a uniform probability distribution. In particular, generally, the number of time differences, both causal and non-causal, that would be expected to be in the l-th bin of the histogram data is given by $\hat{n}_l$ where:

$$\hat{n}_l = N \cdot \alpha \cdot h_l \cdot \Delta b_l + N \cdot (1-\alpha) \cdot p_l \cdot \Delta b_l \quad (2)$$

where $\Delta b_l$ is the width of the l-th bin, $p_l$ represents a probability density for non-causal time differences in the l-th bin, and N is the total number of time differences, both causal and non-causal time, over all bins. Rewriting Equation 2 yields:

$$N \cdot \Delta b_l = \frac{\hat{n}_l}{\alpha \cdot h_l + (1-\alpha) \cdot p_l}, \quad (3)$$

and multiplying by $\alpha\, h_l$ yields:

$$N \cdot \Delta b_l \cdot \alpha \cdot h_l = \hat{C}_l = \frac{\hat{n}_l \cdot \alpha \cdot h_l}{\alpha \cdot h_l + (1-\alpha) \cdot p_l}. \quad (4)$$

If the non-causal probability distribution for non-causal time differences is uniform, then $p_l$ is equal to 1/T for each bin, in which case Equation 4 reduces to Equation 1, noting that $\hat{n}_l$ corresponds to $n_l$ and that $\hat{C}_l$ corresponds to $C_l$. Of course, if it is desired to model non-causal time differences with a non-causal probability distribution (e.g., referred to as W(p)) other than a uniform probability distribution, the more general formula of Equation 4 can be used in place of Equation 1. In such a case, it will be noted that the $p_l$ are not quantities to be determined by the statistical estimation algorithm, but rather are known quantities.

As shown at step 210, the method 200 also comprises calculating an updated probability distribution W(x) based upon the $C_l$. For example, an updated value for $h_l$ for the l-th bin of W(x) can be given by (for each l=1, 2, . . . , K):

$$h_l = \frac{C_l}{\lambda \cdot \Delta b_l}, \quad (5)$$

where $\lambda$ is given by:

$$\lambda = \sum_{l=1}^{K} C_l. \quad (6)$$

$\lambda$ can be interpreted as the expected number of causal time differences over all bins.

As shown at step 212, the method 200 also comprises calculating an updated fraction $\alpha$ based upon the $C_l$. For example, $\alpha$ can be given by:

$$\alpha = \frac{\lambda}{N}, \quad (7)$$

where N is the total number of time differences in the time difference histogram data, as noted previously.

As noted step 214, the algorithm is checked for convergence, and the algorithm is iterated to find updated values of $C_l$, W(x), and $\alpha$ until a convergence criterion is satisfied. For example the algorithm can be iterated until updated values for either W(x) or $\alpha$, or both, differ from previous respective values by no more than some predetermined amount or by no more than some predetermined percent (e.g., 1%, 0.5%, 0.2%, 0.1%, or less than 0.1%).

It will be apparent that the differences between previous values and updated values for W(x) and $\alpha$ can be determined from Equations 5 and 7. The differences between such values effectively reflect a step size in obtaining convergence of those variables. If it is found that fluctuations, rather than convergence, are being obtained while running the algorithm, it is possible to reduce the "step size" in either or both of the W(x) and $\alpha$ values to achieve a slower convergence and greater stability in the algorithm. In other words, rather than make a complete change of one or both of the W(x) and α variables as would be given by Equations 5 and/or 7, a smaller change (e.g., 0.9, 0.8, 0.7, 0.6, or 0.5 times the total change) of the variable can be used.

Thus, with reference to FIG. 2, the method 200 involves calculating time-difference histogram data of the set of time differences $w_k$, the histogram data being stored in the $n_j$ variables. Initial guesses for the variables α, $h_1, h_2, \ldots, h_K$ are made, and a loop is executed wherein the quantities $C_l$ are calculated and the calculated $C_l$ are used to calculate better estimates for α, $h_1, h_2, \ldots, h_K$. The loop is repeated until a criterion for convergence is satisfied.

As noted above a straightforward, brute-force approach can be used to calculate the time-difference histogram data of the $w_k$, which is stored in the variables $n_j$. If there are m incoming messages and n outgoing messages, the straightforward method for this computation requires O(mn) time. A much more efficient algorithm can be used. In particular, the algorithm "HISTOGRAM" shown below can be used to compute the number of time differences $n_l$ in a given bin (l-th bin) with bin boundaries ($b_{low}$, $b_{high}$] from the set of time differences. The algorithm can be repeated for all other bins using the appropriate bin boundaries to determine the number of time differences in the other bins.

---

ALGORITHM HISTOGRAM

```
initialize i=0; j_low=0; j_high=0; L=0
while i < m do
    i := i+1
    while (v_jlow − u_i < b_low) and (j_low < n) do
        j_low := j_low + 1
    while (v_jhigh − u_i < b_high) and (j_high < n) do
        j_high := j_high + 1
    L := L + j_high − j_low
return L
```

---

In the algorithm HISTOGRAM, i, $j_{low}$, and $j_{high}$ are indices, L is the returned number of time differences in the bin under consideration (i.e., the value of L returned by the algorithm provides the value $n_l$ for the l-th bin under consideration). The bin boundaries are given by ($b_{low}$, $b_{high}$]. In addition, $u_1 \leq u_2 \leq \ldots \leq u_m$ are the times at which incoming messages enter the node, and $v_1 \leq v_2 \leq \ldots \leq v_n$ are the times at which outgoing messages leave the node. As noted previously negative time-differences can be ignored, and time differences above an imposed maximum time difference M, which is less than the actual largest time difference, can also be ignored.

The algorithm HISTOGRAM calculates the number of time differences of a single bin in time O(m+n). By running the algorithm HISTOGRAM for each bin, one can calculate the number of time differences in all K bins in the total time O(K·(m+n)).

The algorithm works as follows. The outer loop is over all the incoming message times $u_i$. For each of those, the algorithm finds the number of $w_k$ such that $v_j − u_i$ falls within the given bin. It adds this number to the running count L. At the end, it returns the value of L. The running time for each bin is O(m+n) because each of the inner "while" loops are executed at most n times, regardless of the behavior of the outer while loop.

In addition to determining a probability distribution that represents probabilities of occurrence of time differences between causally related incoming messages and outgoing messages for a node as described herein, it may also be useful to calculate the reproduction rate ρ for a node, which is the expected number of causal outgoing messages for every incoming message. The maximum likelihood estimate for ρ is given by:

$$\rho = \frac{\alpha \cdot N}{m}, \quad (8)$$

where α, N and m are the fraction of causal time differences, the total number of time differences under consideration for the node, and the number of incoming messages, respectively.

Another useful quantity is causal output fraction β for a node, which is the proportion of outgoing messages that are causal. The maximum likelihood estimate for β is given by:

$$\beta = \frac{\alpha \cdot N}{n}, \quad (9)$$

where n is the number of outgoing messages from the node.

Further insight into some theoretical considerations relating to the use of a maximum likelihood estimation algorithm to calculate a probability distribution that represents probabilities of occurrence of time differences between causally related incoming messages and outgoing messages will now be described. As an overview, as noted previously, $u_1, u_2, \ldots, u_m$ are the times at which incoming messages enter a given node, and $v_1, v_2, \ldots, v_n$ are the times at which outgoing messages leave the node. The set of all time differences is given by the various values of $w_k = v_j − u_i$. There are n·m of such time differences in a time difference range [0, T] where T represents a specified maximum time difference as noted previously, but time differences that are negative can be ignored.

The time difference information can be described, with the contributions of causal time-differences being separated from the contributions of non-causal time differences, by considering, for example, the following model. First, if $u_i$ caused $v_j$, then $w_k$ can be a random draw from a random variable with a probability distribution function W (for modeling causal time differences). Second, if $u_i$ did not cause $v_j$, then $w_k$ can be a random draw from the uniform distribution on [0, T] (for modeling non-causal time differences). Third, the $w_k$ are independent. Fourth, a fixed proportion α of the $w_k$ are causal. Fifth, no causal time difference is greater than some fixed maximum M. The fifth consideration is useful to constrain the model, which would otherwise be underconstrained and which could otherwise prevent convergence. Without the fifth consideration, there could be an arbitrary trade-off between the amount of non-causal outgoing messages and the amount of causal outgoing messages whose time differences happen to be uniformly distributed. As suggested previously, M can be an upper limit of causal time differences described by W.

The above described model can be restated in the form of a generative model for the $w_k$. To do so, some hidden variables $c_k$ can be introduced, where $c_k=1$ if $w_k$ is causal, and $c_k=0$ otherwise. The generative model can be formulated as follows: Independently for k=1, 2, ..., N, set $c_k=1$ with probability α, otherwise set $c_k=0$. If $c_k=1$ (representing a causal relationship), draw $w_k$ from a probability distribution W representing causal time differences, otherwise draw $w_k$ from a uniform distribution on [0, T].

In view of the above-described generative model, to estimate α and W(x) given the $w_k$, it is convenient to model W as a histogram-type function. This histogram-type function analogous to W(x) described in detail previously herein. With these considerations in mind, the task of calculating a probability distribution that represents probabilities of occurrence of time differences between causally related incoming messages and outgoing messages can be framed as an estimation problem, that is, to determine $\alpha$, $h_1$, $h_2$, ..., $h_K$, given $w_1$, $w_2$, ..., $w_N$. An approach for addressing estimation problems is to find the maximum likelihood estimate (MLE) for the parameters, i.e., in this case, to find values for $\alpha$ and $h_1$, $h_2$, ..., $h_K$ that maximize the likelihood $p(w_1, w_2, ..., w_N | \alpha, h_1, h_2, ..., h_K)$. The exemplary method 200 described previously herein, which relates to a MLE algorithm, for example, to an estimation-maximization (EM) algorithm, is useful for calculating solutions according to the above-described model. Of course, the invention is not limited to the method 200, nor is it limited to the above-described generative model for modeling causal and non-causal time differences.

According to another aspect, a method for determining a causal path in a system of communicating nodes is provided, wherein each node has an associated probability distribution that represents probabilities of occurrence of time differences between causally related incoming messages and outgoing messages. The method can be executed, for example, by a processing unit such as described previously with reference to FIG. 1B. An exemplary casual path is shown by the dashed line 128 in FIG. 1A.

FIG. 3 illustrates a flow chart of an exemplary method 300 for determining causal paths in a system of communicating nodes. As shown at step 302, the method 300 comprises calculating a probability distribution that represents probabilities of occurrence of time differences between causally related incoming messages and outgoing messages for each of a plurality of nodes. The exemplary method 200 previously described herein can be used, for example, to calculate the probability distributions. As noted at step 304, the method 300 also comprises selecting an incoming message of a node to be a path generating message, wherein the node can be referred to as a path generating node. In this regard, a path generating message is a message that contributes to determining the causal path, and a path generating node is a node that contributes to determining the causal path. The initial path generating message can be viewed as "seed" message. The method further comprises identifying a causal path traced by messages likely to be causally related to one another based upon the path generating message and based upon the probability distributions calculated at step 302 for multiple nodes of the system of communicating nodes. Steps 306–312 are exemplary process steps for identifying a causal path in this regard.

As indicated at step 306, the method 300 can comprise identifying an outgoing message of the path generating node that has a probable causal relationship with the path generating message based upon the probability distribution (from step 302) of the path generating node and based upon time differences between incoming messages and outgoing messages of the path generating node. For example, the outgoing message having a probable causal relationship with the path generating message can be selected as a message that has a time difference relative to the path generating message equal or closest to the most likely causal time difference from the probability distribution of step 302 for that node. In other words, the quantity $\hat{t}$ can be calculated according to:

$$\hat{t} = \arg\max\ W(t-t_j) \quad (10)$$

where $\hat{t}$ is the most likely departure time for a message causally related to the incoming path generating message that arrived at time $t_j$, and where W in Equation 10 is the probability distribution (from step 302) for the present (path generating) node. The departure times of the outgoing messages can then be compared to $\hat{t}$, and a message that matches it can be identified as the likely causally related outgoing message. If multiple outgoing messages satisfy the condition, ties can be broken arbitrarily, e.g., with a random selection of one of the multiple identified outgoing messages. If the maximum probability density of W in Equation 10 is particularly small, e.g., below a predetermined threshold, the path can be terminated.

As noted at step 308, the method 300 can also comprise specifying a next node to which the identified outgoing message traveled to be an updated path generating node. The next node can be identified from message identifiers as described previously. As noted at step 310, the method 300 can also comprise assigning the identified outgoing message to be an updated path generating message. If desired, as noted at step 312, the process can be repeated for another node in the causal path by returning to step 306.

In addition, as noted at step 314, the process can be repeated if desired for one or more newly selected incoming messages of the same node or of a different node (i.e., for one or mores new seed messages), thereby identifying a plurality of causal paths. Also, the method can comprise identifying one or more of the identified causal paths most frequently used to propagate messages. A variety of aggregation tools known to those of ordinary skill in the art can be used to summarize the most frequent paths (e.g., in a top percentage such as 1%, 2%, 3%, 5%, 10%), and to provide the average and/or median causal time differences and variances of the causal time differences.

Termination of the path can be specified according to any suitable criteria. For example, the process can be stopped after a predetermined number of nodes has been visited. Alternatively, for example, the process can be stopped when the path returns to the initial node.

According to another aspect, a method for identifying causal paths that satisfy a performance measure is provided. The method can be executed, for example, by a processing unit such as described previously with reference to FIG. 1B. In particular, the probability distributions that represent probabilities of occurrence of time differences between causally related incoming messages and outgoing messages for the nodes in each of the plurality of identified causal paths can be statistically analyzed. For example, using these probability distributions for the nodes, cumulative median values or cumulative average values of the overall time differences for the nodes of each causal path can be calculated. Then, one or more of the plurality causal paths can be identified satisfying a performance measure (e.g., as being considered problematic) based upon such statistical analysis for each causal path and based upon how frequently each causal path is used to propagate messages in the system. For example, those causal paths with cumulative median or cumulating average time differences above a certain threshold (or in a top predetermined percentage, e.g., 1%, 2%, 3%, 5%, 10%) can be tentatively flagged, and then further analyzed, if desired, to determine which of the paths occur with sufficient frequency to be considered problematic (e.g., by flagging those with path use frequencies above a predetermined threshold or with usage frequencies in a top predetermined percentage, e.g., 1%, 2%, 3%, 5%, 10%)). The latter consideration is pertinent because even if a causal path has large cumulative time-difference characteristics (e.g., large overall latency), the path may not be problematic from a practical perspective if the path occurs too infrequently. Of course, causal paths that satisfy good performance measures can also be identified.

According to another aspect, a method is provided for identifying one or more nodes in a system of communicating nodes that satisfy a performance measure. The method can be executed, for example, by a processing unit such as described previously with reference to FIG. 1B. The method comprises calculating a probability distribution that represents probabilities of occurrence of time differences between causally related incoming messages and outgoing messages for each of a plurality of nodes in the system of communicating nodes. The method 200 described herein can be used, for example, to calculate the probability distributions. The method further comprises statistically analyzing the probability distribution for each of the plurality of nodes. For example, median causal time differences, average causal time differences, and variances can be calculated from the probability distributions. The method further comprises identifying one or more of the plurality of nodes that satisfy a performance measure (e.g., as being considered problematic) based upon the statistical analysis for each node, such as described above for identifying problematic causal paths. The identification can further be based upon how frequently each node is used in propagating messages in the system, such as described above for identifying problematic causal paths.

For example, such identification of nodes that satisfy the performance measure can be carried out by comparing a statistical analysis result (e.g., median causal time difference or average causal time difference) for each of the plurality of nodes with aggregated statistical analysis results for all of the nodes (e.g., the overall median or average causal time differences for all nodes under consideration). For example, such a comparison can identify those nodes with statistical analysis results greater than a corresponding overall result for all the nodes (e.g., greater than an overall median or average). Alternatively, the identification could flag those nodes with statistical analysis results greater than one standard deviation above a corresponding overall analysis result. Identification of problematic nodes can also be carried out by identifying nodes that have a statistical analysis result above a predetermined threshold value or by identifying nodes that have a statistical analysis result within a top predetermined percentage of such results, e.g., 1%, 2%, 3%, 5%, 10%. In either of these approaches, the tentatively identified problematic nodes can be further analyzed to determine which of the nodes are used with sufficient frequency to be considered problematic (e.g., by flagging those with use frequencies above a predetermined threshold or with use frequencies in a top predetermined percentage, such as 1%, 2%, 3%, 5%, 10%). As suggested above, the latter consideration is pertinent because even if a node has a large latency, it may not be problematic from a practical perspective if the node is used too infrequently to have significant consequences. Of course, nodes that satisfy good performance measures can also be identified.

According to another aspect, probability distributions that represent probabilities of occurrence of time differences between causally related incoming messages and outgoing messages can be determined for a given node at different times of the day or at different days of the week, for example, considering that such probability distributions may not be constant over time. Those probability distributions can then be analyzed to determine whether a given node is performing satisfactorily at some times, but problematically at other times.

Any of the information obtained by the methods described herein can be displayed on any suitable display for visualization and analysis of the information.

According to another aspect, any form of computer readable carrier can contain processing instructions adapted to a cause a processor to execute the methods described herein. The computer readable carrier can be any suitable type of carrier, such as solid-state memory (e.g., read only memory (ROM), random access memory (RAM), etc.), magnetic memory, optical memory, other type of memory, or modulated carrier wave (such as radio frequency, audio frequency, or optical frequency modulated carrier waves) containing an appropriate set of computer instructions that would cause a processing unit to carry out the techniques described herein.

Among the potential advantages of the approaches described herein include the following. The approaches described herein can be applied broadly to any type of distributed system where messages can be traced. The approaches can produce detailed information of the causal time differences associated with nodes in causal paths of the system, in particular, probability distributions of those causal time differences. The approaches described herein may produce more accurate results than those provided by previous methods for certain types of systems, especially those where latencies of a node are not concentrated around a single value. The approaches described herein may be faster to execute than previous methods.

Exemplary embodiments have been described. It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method for calculating a probability distribution that represents probabilities of occurrence of time differences between causally related incoming messages and outgoing messages of a node in a system of communicating nodes, the method comprising:

obtaining a set of time differences between times at which incoming messages arrive at a node and times at which outgoing messages leave the node, the set of time differences including time differences between causally related incoming messages and outgoing messages and time differences between incoming messages and outgoing messages that are not causally related; and processing the set of time differences using a statistical estimation algorithm to calculate the probability distribution that represents probabilities of occurrence of time differences between causally related incoming messages and outgoing messages.

2. The method of claim 1, wherein the statistical estimation algorithm models both time differences between causally related incoming and outgoing messages and time differences between incoming and outgoing messages that are not causally related.

3. The method of claim 2, wherein the statistical estimation algorithm treats a fraction of the time differences as being for messages that are causally related, and wherein the fraction is a variable to be determined by the statistical estimation algorithm.

4. The method of claim 2, wherein the time differences between incoming messages and outgoing messages that are not causally related are modeled with a uniform probability distribution.

5. The method of claim 1, wherein the statistical estimation algorithm is a maximum likelihood estimate algorithm.

6. The method of claim 5, wherein the maximum likelihood estimate algorithm is an expectation-maximization algorithm.

7. The method of claim 1, wherein the statistical estimation algorithm is an iterative algorithm wherein iterations are carried out until a convergence criterion is satisfied.

8. The method of claim 1, wherein the probability distribution is a discrete distribution comprising a plurality of bins, wherein a width of each bin is defined by an upper time difference and a lower time difference, wherein each bin has an associated probability density corresponding to a probability of a time difference between causally related incoming messages and outgoing messages occurring within said bin, and wherein each probability density is a variable to be determined by the statistical estimation algorithm.

9. The method of claim 1, wherein processing the set of time differences using a statistical estimation algorithm comprises:
   (a) initializing the probability distribution, which is represented by a histogram $W(x)$ whose value for an l-th bin is $h_l$, wherein each $h_l$ is a variable that is proportional to a probability of a time difference between causally related incoming messages and outgoing messages being within a range of the l-th bin, and wherein there are K bins, and initializing a variable $\alpha$, wherein $\alpha$ is a fraction of the time differences that are causal;
   (b) calculating a number $n_l$ of the time differences within the range of the l-th bin for l=1, 2, . . . , K;
   (c) calculating an expected number of causal time differences $C_l$ between causally related incoming and outgoing messages within the range of the l-th bin based upon $\alpha$, $h_l$ and $n_l$, for l=1, 2, . . . , K;
   (d) calculating an updated probability distribution $W(x)$ based upon the $C_l$; and
   (e) calculating an updated fraction a based upon the $C_l$; and
   (f) iterating steps (c)–(e) until a convergence criterion is satisfied.

10. The method of claim 9, wherein the expected number of causal time differences, $C_l$, associated with an l-th bin of the probability distribution is given by:

$$C_l = \frac{n_l \cdot \alpha \cdot h_l}{\alpha \cdot h_l + (1-\alpha)/T}$$

wherein:
$n_l$ represents a number of time differences, both causal and non-causal, in the l-th bin,
$\alpha$ represents an estimated fraction of the time differences that are for causally related incoming messages and outgoing messages, $\alpha$ being a variable to be determined by the statistical estimation algorithm,
$h_l$ represents a probability density of a causal time difference occurring in the l-th bin, and
T represents a specified maximum time difference.

11. The method of claim 9, wherein widths of the bins increase exponentially with time difference.

12. The method of claim 9, wherein the number of time differences $n_l$ in the l-th bin is determined according to the following algorithm:

```
initialize i=0, j_low=0, j_high=0, L=0,
while i < m do
    i := i+1
    while (v_jlow - u_i < b_low) and (j_low < n) do
        j_low := j_low + 1
    while (v_jhigh - u_i < b_high) and (j_high < n) do
        j_high := j_high + 1
    L := L + j_high - j_low
return L,
``` wherein
i, $j_{low}$, and $j_{high}$ are indices,
boundaries of the l-th bin are given by $(b_{low}, b_{high}]$,
L is the returned number of time differences in the bin under consideration,
$u_1 \leq u_2 \leq \ldots \leq u_m$ are the times at which incoming messages enter the node, and
$v_1 \leq v_2 \leq \ldots \leq v_n$ are the times at which outgoing messages leave the node.

13. A method for determining a causal path in a system of communicating nodes, each node having an associated probability distribution that represents probabilities of occurrence of time differences between causally related incoming messages and outgoing messages, the method comprising:
   (a) calculating the probability distribution that represents probabilities of occurrence of time differences between causally related incoming messages and outgoing messages for each of a plurality of nodes according to the method of claim 1;
   (b) selecting an incoming message of a node to be a path generating message, said node being referred to as a path generating node; and
   (c) identifying a causal path traced by messages likely to be causally related to one another based upon the path generating message and based upon the probability distributions of multiple nodes of the system of communicating nodes.

14. The method of claim 13, wherein identifying the causal path in step (c) comprises:
   (d) identifying an outgoing message of the path generating node that has a probable causal relationship with the path generating message based upon the probability distribution of the path generating node and based upon time differences between incoming messages and outgoing messages of the path generating node;
   (e) specifying a next node to which the identified outgoing message traveled to be an updated path generating node;
   (f) assigning the identified outgoing message to be an updated path generating message; and
   (g) repeating steps (d)–(f).

15. The method of claim 13, comprising:
repeating steps (b) and (c) for each of a plurality of additional incoming messages at said node, thereby identifying a plurality of causal paths.

16. The method of claim 15, comprising identifying one or more causal paths most frequently used to propagate messages.

17. The method of claim 15, comprising:
statistically analyzing the probability distributions for the nodes in each of the plurality of causal paths; and identifying one or more of the plurality causal paths that satisfy a performance measure based upon the statistical analysis for each causal path.

18. A method for identifying one or more nodes in a system of communicating nodes, comprising:
calculating the probability distribution that represents probabilities of occurrence of time differences between causally related incoming messages and outgoing messages for each of a plurality of nodes according to the method of claim 1;
statistically analyzing the probability distribution for each of the plurality of nodes; and
identifying one or more of the plurality of nodes that meets a performance measure based upon the statistical analysis.

19. An apparatus for calculating a probability distribution that represents probabilities of occurrence of time differences between causally related incoming messages and outgoing messages of a node in a system of communicating nodes, the apparatus comprising:
a memory; and
a processing unit arranged to communicate with the memory, the processing unit being configured to execute steps of:
obtaining a set of time differences between times at which incoming messages arrive at a node and times at which outgoing messages leave the node, the set of time differences including time differences between causally related incoming messages and outgoing messages and time differences between incoming messages and outgoing messages that are not causally related; and
processing the set of time differences using a statistical estimation algorithm to calculate the probability distribution that represents probabilities of occurrence of time differences between causally related incoming messages and outgoing messages.

20. The apparatus of claim 19, wherein the statistical estimation algorithm models both time differences between causally related incoming and outgoing messages and time differences between incoming and outgoing messages that are not causally related.

21. The apparatus of claim 20, wherein the statistical estimation algorithm treats a fraction of the time differences as being for messages that are causally related, and wherein the fraction is a variable to be determined by the statistical estimation algorithm.

22. The apparatus of claim 20, wherein the time differences between incoming messages and outgoing messages that are not causally related are modeled with a uniform probability distribution.

23. The apparatus of claim 19, wherein the statistical estimation algorithm is a maximum likelihood estimate algorithm.

24. The apparatus of claim 23, wherein the maximum likelihood estimate algorithm is an expectation-maximization algorithm.

25. The apparatus of claim 19, wherein the statistical estimation algorithm is an iterative algorithm wherein iterations are carried out until a convergence criterion is satisfied.

26. The method of claim 19, wherein the probability distribution is a discrete distribution comprising a plurality of bins, wherein a width of each bin is defined by an upper time difference and a lower time difference, wherein each bin has an associated probability density corresponding to a probability of a time difference between causally related incoming messages and outgoing messages occurring within said bin, and wherein each probability density is a variable to be determined by the statistical estimation algorithm.

27. The apparatus of claim 19, wherein processing the set of time differences using a statistical estimation algorithm comprises:
(a) initializing the probability distribution, which is represented by a histogram W(x) whose value for an l-th bin is $h_l$, wherein each $h_l$ is a variable that is proportional to a probability of a time difference between causally related incoming messages and outgoing messages being within a range of the l-th bin, and wherein there are K bins, and initializing a variable $\alpha$, wherein $\alpha$ is a fraction of the time differences that are causal;
(b) calculating a number $n_l$ of the time differences within the range of the l-th bin for l=1, 2, . . . , K;
(c) calculating an expected number of causal time differences $C_l$ between causally related incoming and outgoing messages within the range of the l-th bin based upon $\alpha$, $h_l$ and $n_l$, for l=1, 2, . . . , K;
(d) calculating an updated probability distribution W(x) based upon the $C_l$; and
(e) calculating an updated fraction a based upon the $C_l$; and
(f) iterating steps (c)–(e) until a convergence criterion is satisfied.

28. The apparatus of claim 27, wherein the expected number of causal time differences, $C_l$, associated with an l-th bin of the probability distribution is given by:

$$C_l = \frac{n_l \cdot \alpha \cdot h_l}{\alpha \cdot h_l + (1-\alpha)/T}$$

wherein:
$n_l$ represents a number of time differences, both causal and non-causal, in the l-th bin,
$\alpha$ represents an estimated fraction of the time differences that are for causally related incoming messages and outgoing messages, $\alpha$ being a variable to be determined by the statistical estimation algorithm,
$h_l$ represents a probability density of a causal time difference occurring in the l-th bin, and
T represents a specified maximum time difference.

29. The apparatus of claim 27, wherein widths of the bins increase exponentially with time difference.

30. The apparatus of claim 27, wherein the number of time differences $n_l$ in the l-th bin is determined according to the following algorithm:

```
initialize i=0, j_low=0, j_high=0, L=0,
while i < m do
    i := i+1
    while (v_jlow − u_i < b_low) and (j_low < n) do
        j_low := j_low + 1
    while (v_jhigh − u_i < b_high) and (j_high < n) do
        j_high := j_high + 1
    L := L + j_high − j_low
return L,
``` wherein
i, $j_{low}$, and $j_{high}$ are indices,
boundaries of the l-th bin are given by ($b_{low}$, $b_{high}$],
L is the returned number of time differences in the bin under consideration,
$u_1 \leq u_2 \leq \ldots \leq u_m$ are the times at which incoming messages enter the node, and $v_1 \leq v_2 \leq \ldots \leq v_n$ are the times at which outgoing messages leave the node.

31. An apparatus for determining a causal path in a system of communicating nodes, each node having an associated probability distribution that represents probabilities of occurrence of time differences between causally related incoming messages and outgoing messages, the apparatus comprising:
   a memory; and
   a processing unit arranged to communicate with the memory, the processor unit being configured to execute steps of:
   (a) calculating the probability distribution that represents probabilities of occurrence of time differences between causally related incoming messages and outgoing messages for each of a plurality of nodes according to the method of claim 1;
   (b) selecting an incoming message of a node to be a path generating message, said node being referred to as a path generating node; and
   (c) identifying a causal path traced by messages likely to be causally related to one another based upon the path generating message and based upon the probability distributions of multiple nodes of the system of communicating nodes.

32. The apparatus of claim 31, wherein identifying the causal path in step (c) comprises:
   (d) identifying an outgoing message of the path generating node that has a probable causal relationship with the path generating message based upon the probability distribution of the path generating node and based upon time differences between incoming messages and outgoing messages of the path generating node;
   (e) specifying a next node to which the identified outgoing message traveled to be an updated path generating node;
   (f) assigning the identified outgoing message to be an updated path generating message; and
   (g) repeating steps (d)–(f).

33. The apparatus of claim 31, wherein the processing unit is configured to:
   repeat steps (b) and (c) for each of a plurality of additional incoming messages at said node, thereby identifying a plurality of causal paths.

34. The apparatus of claim 33, wherein the processing unit is configured to identify one or more causal paths most frequently used to propagate messages.

35. The apparatus of claim 33, wherein the processing unit is configured to:
   statistically analyze the probability distributions for the nodes in each of the plurality of causal paths; and
   identify one or more of the plurality causal paths that satisfy a performance measure based upon the statistical analysis for each causal path.

36. An apparatus for identifying one or more nodes in a system of communicating nodes, comprising:
   a memory; and
   a processing unit arranged to communicate with the memory, the processor unit being configured to execute steps of:
   calculating the probability distribution that represents probabilities of occurrence of time differences between causally related incoming messages and outgoing messages for each of a plurality of nodes according to the method of claim 1;
   statistically analyzing the probability distribution for each of the plurality of nodes; and
   identifying one or more of the plurality of nodes that meets a performance measure based upon the statistical analysis.

37. A computer-readable carrier containing processing instructions adapted to cause a processing unit to calculate a probability distribution that represents probabilities of occurrence of time differences between causally related incoming messages and outgoing messages of a node in a system of communicating nodes by executing steps of:
   obtaining a set of time differences between times at which incoming messages arrive at a node and times at which outgoing messages leave the node, the set of time differences including time differences between causally related incoming messages and outgoing messages and time differences between incoming messages and outgoing messages that are not causally related; and
   processing the set of time differences using a statistical estimation algorithm to calculate the probability distribution that represents probabilities of occurrence of time differences between causally related incoming messages and outgoing messages.

38. The computer-readable carrier of claim 37, wherein the statistical estimation algorithm models both time differences between causally related incoming and outgoing messages and time differences between incoming and outgoing messages that are not causally related.

39. The computer-readable carrier of claim 38, wherein the statistical estimation algorithm treats a fraction of the time differences as being for messages that are causally related, and wherein the fraction is a variable to be determined by the statistical estimation algorithm.

40. The computer-readable carrier of claim 38, wherein the time differences between incoming messages and outgoing messages that are not causally related are modeled with a uniform probability distribution.

41. The computer-readable carrier of claim 37, wherein the statistical estimation algorithm is a maximum likelihood estimate algorithm.

42. The computer-readable carrier of claim 41, wherein the maximum likelihood estimate algorithm is an expectation-maximization algorithm.

43. The computer-readable carrier of claim 37, wherein the statistical estimation algorithm is an iterative algorithm wherein iterations are carried out until a convergence criterion is satisfied.

44. The computer-readable carrier of claim 37, wherein the probability distribution is a discrete distribution comprising a plurality of bins, wherein a width of each bin is defined by an upper time difference and a lower time difference, wherein each bin has an associated probability density corresponding to a probability of a time difference between causally related incoming messages and outgoing messages occurring within said bin, and wherein each probability density is a variable to be determined by the statistical estimation algorithm.

45. The computer-readable carrier of claim 37, wherein processing the set of time differences using a statistical estimation algorithm comprises:
   (a) initializing the probability distribution, which is represented by a histogram $W(x)$ whose value for an l-th bin is $h_l$, wherein each $h_l$ is a variable that is proportional to a probability of a time difference between causally related incoming messages and outgoing messages being within a range of the l-th bin, and wherein there are K bins, and initializing a variable $\alpha$, wherein $\alpha$ is a fraction of the time differences that are causal;

(b) calculating a number $n_l$ of the time differences within the range of the l-th bin for l=1, 2, . . . , K;

(c) calculating an expected number of causal time differences $C_l$ between causally related incoming and outgoing messages within the range of the l-th bin based upon $\alpha$, $h_l$ and $n_l$, for l=1, 2, . . . , K;

(d) calculating an updated probability distribution W(x) based upon the $C_l$; and (e) calculating an updated fraction a based upon the $C_l$; and (f) iterating steps (c)–(e) until a convergence criterion is satisfied.

46. The computer-readable carrier of claim 45, wherein the expected number of causal time differences, $C_l$, associated with an l-th bin of the probability distribution is given by:

$$C_l = \frac{n_l \cdot \alpha \cdot h_l}{\alpha \cdot h_l + (1-\alpha)/T}$$

wherein:

$n_l$ represents a number of time differences, both causal and non-causal, in the l-th bin, $\alpha$ represents an estimated fraction of the time differences that are for causally related incoming messages and outgoing messages, $\alpha$ being a variable to be determined by the statistical estimation algorithm, $h_l$ represents a probability density of a causal time difference occurring in the l-th bin, and T represents a specified maximum time difference.

47. The computer-readable carrier of claim 45, wherein widths of the bins increase exponentially with time difference.

48. The method computer-readable carrier of claim 45, wherein the number of time differences $n_l$ in the l-th bin is determined according to the following algorithm:

```
initialize i=0, j_low=0, j_high=0, L=0,
while i < m do
    i := i+1
    while (v_jlow − u_i < b_low) and (j_low < n) do
        j_low := j_low + 1
    while (v_jhigh − u_i < b_high) and (j_high < n) do
        j_high := j_high + 1
    L := L + j_high − j_low
return L,
``` wherein i, $j_{low}$, and $j_{high}$ are indices, boundaries of the l-th bin are given by ($b_{low}$, $b_{high}$], L is the returned number of time differences in the bin under consideration, $u_1 \leq u_2 \leq \ldots \leq u_m$ are the times at which incoming messages enter the node, and $v_1 \leq v_2 \leq \ldots \leq v_n$ are the times at which outgoing messages leave the node.

49. A computer readable carrier containing processing instructions adapted to cause a processing unit to determine a causal path in a system of communicating nodes, each node having an associated probability distribution that represents probabilities of occurrence of time differences between causally related incoming messages and outgoing messages, by executing steps of:

(a) calculating the probability distribution that represents probabilities of occurrence of time differences between causally related incoming messages and outgoing messages for each of a plurality of nodes according to the method of claim 1;

(b) selecting an incoming message of a node to be a path generating message, said node being referred to as a path generating node; and (c) identifying a causal path traced by messages likely to be causally related to one another based upon the path generating message and based upon the probability distributions of multiple nodes of the system of communicating nodes.

50. The computer-readable carrier of claim 49, wherein identifying the causal path in step (c) comprises:

(d) identifying an outgoing message of the path generating node that has a probable causal relationship with the path generating message based upon the probability distribution of the path generating node and based upon time differences between incoming messages and outgoing messages of the path generating node;

(e) specifying a next node to which the identified outgoing message traveled to be an updated path generating node;

(f) assigning the identified outgoing message to be an updated path generating message; and (g) repeating steps (d)–(f).

51. The computer-readable carrier of claim 49, adapted to a cause the processing unit to execute steps of:

repeating steps (b) and (c) for each of a plurality of additional incoming messages at said node, thereby identifying a plurality of causal paths.

52. The computer-readable carrier of claim 51, adapted to cause the processing unit to identify one or more causal paths most frequently used to propagate messages.

53. The computer-readable carrier of claim 51, adapted to cause the processing unit to:

statistically analyze the probability distributions for the nodes in each of the plurality of causal paths; and identify one or more of the plurality causal paths that satisfy a performance measure based upon the statistical analysis for each causal path.

54. A computer-readable carrier containing processing instructions adapted to cause a processing unit to identify one or more nodes in a system of communicating nodes, by executing steps of:

calculating the probability distribution that represents probabilities of occurrence of time differences between causally related incoming messages and outgoing messages for each of a plurality of nodes according to the method of claim 1;

statistically analyzing the probability distribution for each of the plurality of nodes; and identifying one or more of the plurality of nodes that meets a performance measure based upon the statistical analysis.

55. An apparatus for calculating a probability distribution that represents probabilities of occurrence of time differences between causally related incoming messages and outgoing messages of a node in a system of communicating nodes, the apparatus comprising:

a memory; and means for obtaining a set of time differences between times at which incoming messages arrive at a node and times at which outgoing messages leave the node, the set of time differences including time differences between causally related incoming messages and outgoing messages and time differences between incoming messages and outgoing messages that are not causally related, and processing the set of time differences using a statistical estimation algorithm to calculate the probability distribution that represents probabilities of occurrence of time differences between causally related incoming messages and outgoing messages.

* * * * *

UNITED STATES PATENT AND TRADEMARK OFFICE
CERTIFICATE OF CORRECTION

PATENT NO. : 7,027,951 B1 Page 1 of 1
APPLICATION NO. : 10/965915
DATED : April 11, 2006
INVENTOR(S) : John Philip MacCormick et al.

It is certified that error appears in the above-identified patent and that said Letters Patent is hereby corrected as shown below:

In column 15, line 42, in Claim 9, after "fraction" delete "a" and insert -- $\alpha$ --, therefor.

In column 16, line 18, in Claim 12, delete "($b_{low}$, $b_{high}$]," and insert -- ($b_{low}$, $b_{high}$), --, therefor.

In column 18, line 22, in Claim 27, after "fraction" delete "a" and insert -- $\alpha$ --, therefor.

In column 18, line 63, in Claim 30, delete "($b_{low}$, $b_{high}$]," and insert -- ($b_{low}$, $b_{high}$), --, therefor.

In column 21, line 9, in Claim 45, after "fraction" delete "a" and insert -- $\alpha$ --, therefor.

In column 21, line 52, in Claim 48, delete "($b_{low}$, $b_{high}$]," and insert -- ($b_{low}$, $b_{high}$), --, therefor.

Signed and Sealed this

Twelfth Day of May, 2009

JOHN DOLL
*Acting Director of the United States Patent and Trademark Office*